United States Patent
Alexander et al.

(10) Patent No.: US 9,075,457 B2
(45) Date of Patent: Jul. 7, 2015

(54) SYSTEM AND METHOD FOR INTERFACING APPLICATIONS PROCESSOR TO TOUCHSCREEN DISPLAY FOR REDUCED DATA TRANSFER

(75) Inventors: Daniel D. Alexander, Gilbert, AZ (US); Timothy L. Blankenship, Austin, TX (US); Yassar A. Ali, Sunnyvale, CA (US); Andrew Chan, Fremont, CA (US); Feihua Zhang, Gilbert, AZ (US)

(73) Assignee: Maxim Integrated Products, Inc., San Jose, CA (US)

( * ) Notice: Subject to any disclaimer, the term of this patent is extended or adjusted under 35 U.S.C. 154(b) by 945 days.

(21) Appl. No.: 12/620,430

(22) Filed: Nov. 17, 2009

(65) Prior Publication Data

US 2010/0149121 A1 Jun. 17, 2010

Related U.S. Application Data

(60) Provisional application No. 61/122,269, filed on Dec. 12, 2008.

(51) Int. Cl.
*G06F 3/041* (2006.01)
*G09G 5/36* (2006.01)
*G06F 3/038* (2013.01)

(52) U.S. Cl.
CPC .............. *G06F 3/038* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 5,327,161 A * | 7/1994 | Logan et al. | 345/157 |
| 2005/0110768 A1* | 5/2005 | Marriott et al. | 345/173 |
| 2006/0077183 A1* | 4/2006 | Studt | 345/173 |
| 2006/0097991 A1* | 5/2006 | Hotelling et al. | 345/173 |
| 2006/0284840 A1* | 12/2006 | Moosavi et al. | 345/157 |
| 2008/0225009 A1* | 9/2008 | Wang | 345/173 |
| 2009/0115740 A1* | 5/2009 | Ningrat et al. | 345/173 |

* cited by examiner

*Primary Examiner* — Christopher R Lamb
(74) *Attorney, Agent, or Firm* — North Weber & Baugh LLP

(57) ABSTRACT

System and method for substantially reducing an involvement of an applications processor in receiving data from a touchscreen display. In one aspect, the system includes a controller may be configured in an autonomous mode where it automatically measures the touchscreen display based configuration information received from the applications processor, determines notable events based on the measurement data, stores data and event identifiers related to the notable events in a memory, and sends a notification to the applications processor when event data is available In another aspect, the system includes a controller that filters user interactions events and transmits data related to only notable events to the applications processor. Because of the autonomous and event filtering operations of the touchscreen controller, there are substantially less communications between the controller and the applications processor. This improves the speed and efficiency of the applications processor.

27 Claims, 7 Drawing Sheets

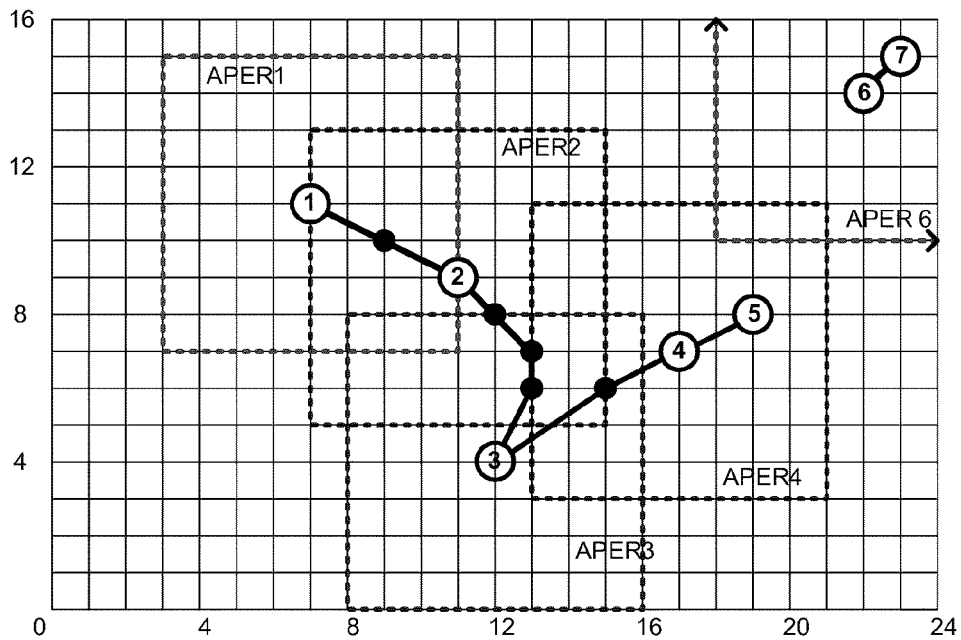
PANEL TOUCH SPATIAL WAVEFORM One drag event (1:5) and one press event (6:7) shown
INTERRUPT TIMING WAVEFORM 1 (assuming frequent servicing events w/ aperture)
INTERRUPT TIMING WAVEFORM 2 (assuming frequent servicing events w/o aperature)
INTERRUPT TIMING WAVEFORM 3 (assuming infrequent servicing events)
(1) IRQ issued     (Serviced) IRQ released
FIG. 3

| SAMPLE | X | Y | TAG | COMMENT |
|---|---|---|---|---|
| 1 | 7 | 11 | 00 | INITIAL EVENT (FIRST TOUCH) |
| 2 | 11 | 9 | 01 | MID-PRESS EVENT |
| 3 | 12 | 4 | 01 | MID-PRESS EVENT |
| 4 | 17 | 7 | 01 | MID-PRESS EVENT |
| 5 | 19 | 8 | 10 | RELEASE EVENT (FIRST TOUCH END) |
| 6 | 22 | 14 | 00 | INITIAL EVENT (SECOND TOUCH) |
| 7 | 23 | 15 | 10 | RELEASE EVENT (SECOND TOUCH END) |

FIG. 4

| SAMPLE | X | Y | TAG | COMMENT |
|---|---|---|---|---|
| 1 | 7 | 11 | 00 | INITIAL EVENT (FIRST TOUCH) |
| 1A | 9 | 10 | 01 | MID-PRESS EVENT |
| 2 | 11 | 9 | 01 | MID-PRESS EVENT |
| 2A | 12 | 8 | 01 | MID-PRESS EVENT |
| 2B | 13 | 7 | 01 | MID-PRESS EVENT |
| 2C | 13 | 6 | 01 | MID-PRESS EVENT |
| 3 | 12 | 4 | 01 | MID-PRESS EVENT |
| 3A | 15 | 6 | 01 | MID-PRESS EVENT |
| 4 | 17 | 7 | 01 | MID-PRESS EVENT |
| 5 | 19 | 8 | 10 | RELEASE EVENT (FIRST TOUCH END) |
| 6 | 22 | 14 | 00 | INITIAL EVENT (SECOND TOUCH) |
| 7 | 23 | 15 | 10 | RELEASE EVENT (SECOND TOUCH END) |

FIG. 5

SYSTEM AND METHOD FOR INTERFACING APPLICATIONS PROCESSOR TO TOUCHSCREEN DISPLAY FOR REDUCED DATA TRANSFER

CROSS REFERENCE TO RELATED APPLICATION

This application claims priority to Provisional Patent Application, Ser. No. 61/122,269, filed on Dec. 12, 2008, and entitled "System and Method for Interfacing Touchscreen Display with Applications Processor for Reduced Data Transfer," which is incorporated herein by reference.

FIELD

This invention relates generally to controllers for touchscreen displays, and in particular, to a system and method for interfacing an applications processor to a touchscreen display in a manner that reduces communications between the controller and the applications processor.

BACKGROUND

A touchscreen controller is typically employed for interfacing an applications processor with a touchscreen display. The touchscreen controller senses interactions of the touchscreen display by the user, and communicates those interactions to the applications processor. Such interactions may include initial touching of the display by the user, dragging a pointer or finger across the display, and releasing the pointer or finger from the display. Based on the application, the applications processor performs one or more operations in response to the detected interactions.

In the past, the touchscreen controller would communicate all detectable user interactions or events to the applications processor, no matter how small or minute those interactions were. Such operation would result in a large number of communications between the touchscreen controller and the applications processor. This generally reduced the speed and efficiency of the applications processor in performing user applications. This is better exemplified with reference to the following example.

FIG. 1 illustrates a flow diagram of a method 100 of interfacing an applications processor with a touchscreen display using a conventional touchscreen controller (TSC). According to the method 100, a touchscreen controller sits in idle mode issuing an interrupt signal IRQ=0 indicating that the touchscreen display is not being touched (block 102). Then, in response to the touchscreen controller detecting the touching of the touchscreen display and issuing an interrupt signal IRQ=1 indicating the same, the applications processor sends a request to the touchscreen controller to perform a measurement of the touchscreen display (block 104). In response to the measurement request, the touchscreen controller performs the requested measurement (block 108), while the applications processor waits a time interval of $T_{MEASUREMENT}$ for the measurement to be complete (block 106).

Once the measurement has been completed, the applications processor retrieves the measurement data from the touchscreen controller (block 110). Then, the applications processor determines whether the touchscreen display is being touched based on the interrupt signal IRQ issued by the touchscreen controller (block 112). If the touchscreen display is not being touched as indicated by the interrupt signal IRQ=0, the applications processor causes the touchscreen controller to revert back to idle mode (block 102). On the other hand, if the touchscreen display is being touched as indicated by the interrupt signal IRQ=1, the applications processor waits a time interval $T_{SAMPLE}$ for the next scheduled measurement cycle (block 114) before requesting another measurement (block 104).

As apparent from the flow diagram of the method 100, the applications processor is highly involved in the touchscreen measurement process. For instance, for each measurement cycle, the applications processor sends a request for measurement to the touchscreen controller, retrieves the measurement data, and determines whether the touchscreen is being touched based on the IRQ signal. This involvement consumes a substantial amount of time and resources for the applications processor, which could be allocated to other more useful operations, such as user applications.

SUMMARY

An aspect of the invention relates to a system and method of interfacing an applications processor with a touchscreen display or other position-indicating device. According to this aspect, a controller may be configured in an autonomous mode where it automatically measures the touchscreen display based configuration information received from the applications processor, determines notable events based on the measurement data, stores data and event identifiers related to the notable events in a memory, and sends a notification to the applications processor when event data is available. The use of such controller and its techniques substantially reduces the involvement of the applications processor in interfacing with the touchscreen display. For instance, the applications processor need only to receive notification from the controller as to when data is available, and to access the data at its leisure based on the current user application.

Another aspect of the invention relates to a system and method for reducing data transfer, related to user interaction of a touchscreen display or other position-indicating device, between a controller and an applications processor. In this regard, the controller filters user interaction events so that data related to only filtered notable user interactions events are transmitted to the applications processor. Such notable events may include initial touches of the touch screen display by the user, releases or removal of the pointer or finger from the touchscreen display, and mid-press or dragging of the pointer or finger across the touchscreen display that exceeds a defined distance. Because of the filtering operation performed by the touchscreen controller, there are substantially less data transfer between the controller and the applications processor. This improves the speed and efficiency of the applications processor.

Other aspects, advantages and novel features of the present invention will become apparent from the following detailed description of the invention when considered in conjunction with the accompanying drawings.

BRIEF DESCRIPTION OF THE DRAWINGS

FIG. 3 illustrates a diagram of an exemplary touchscreen display illustrating an aperture filtering concept in accordance with another embodiment of the invention.

FIG. 4 illustrates an exemplary table of recorded touchscreen measurement data stored in a first-in-first-out (FIFO) memory in the case where aperture filtering is enabled in accordance with another embodiment of the invention.

FIG. 5 illustrates an exemplary table of recorded touchscreen measurement data stored in a first-in-first-out (FIFO) memory in the case where aperture filtering is not enabled.

DETAILED DESCRIPTION OF THE EXEMPLARY EMBODIMENTS

Figure 1:
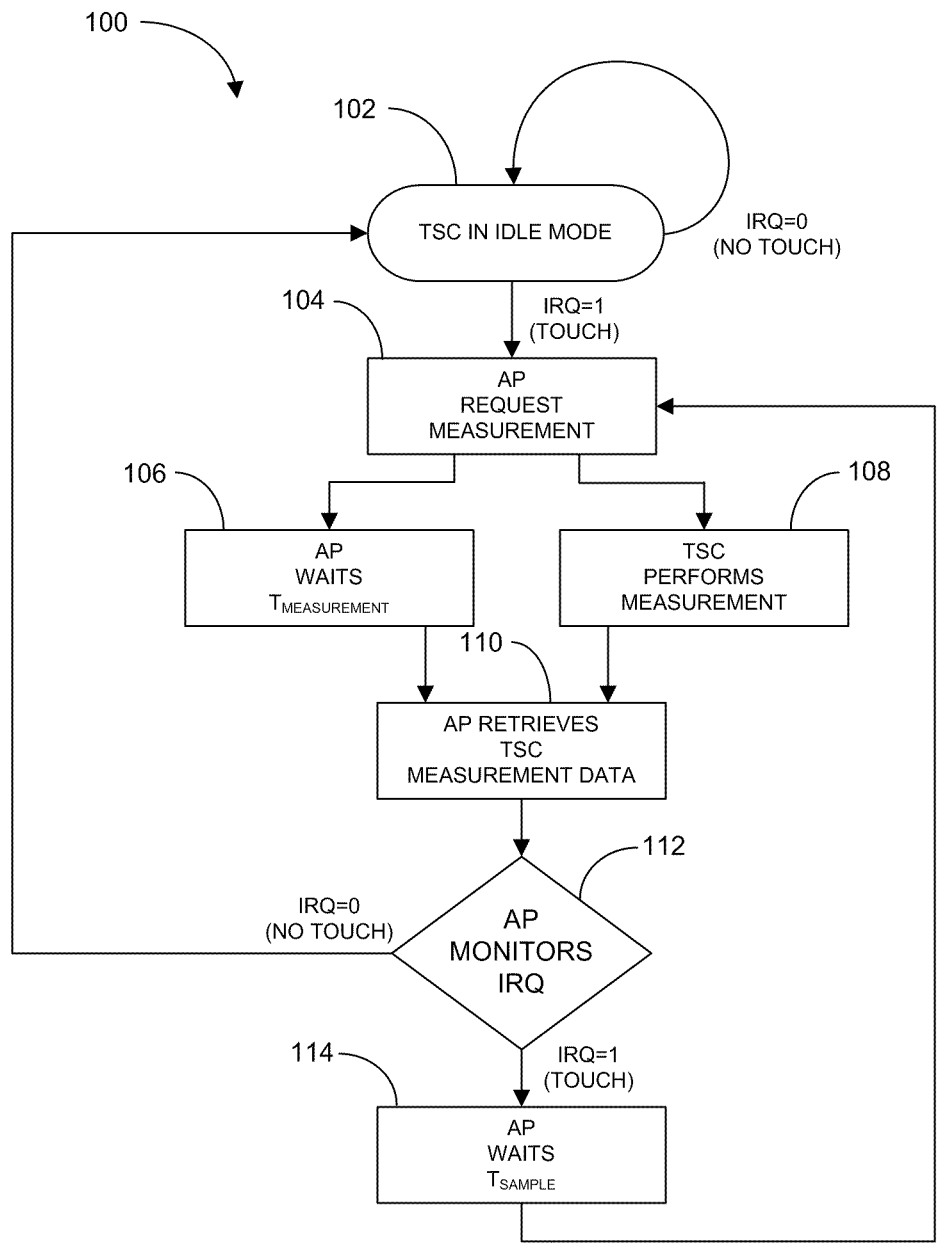
FIG. 1 illustrates a flow diagram of a method of interfacing an applications processor with a touchscreen display using a conventional touchscreen controller (TSC).
Figure 2:
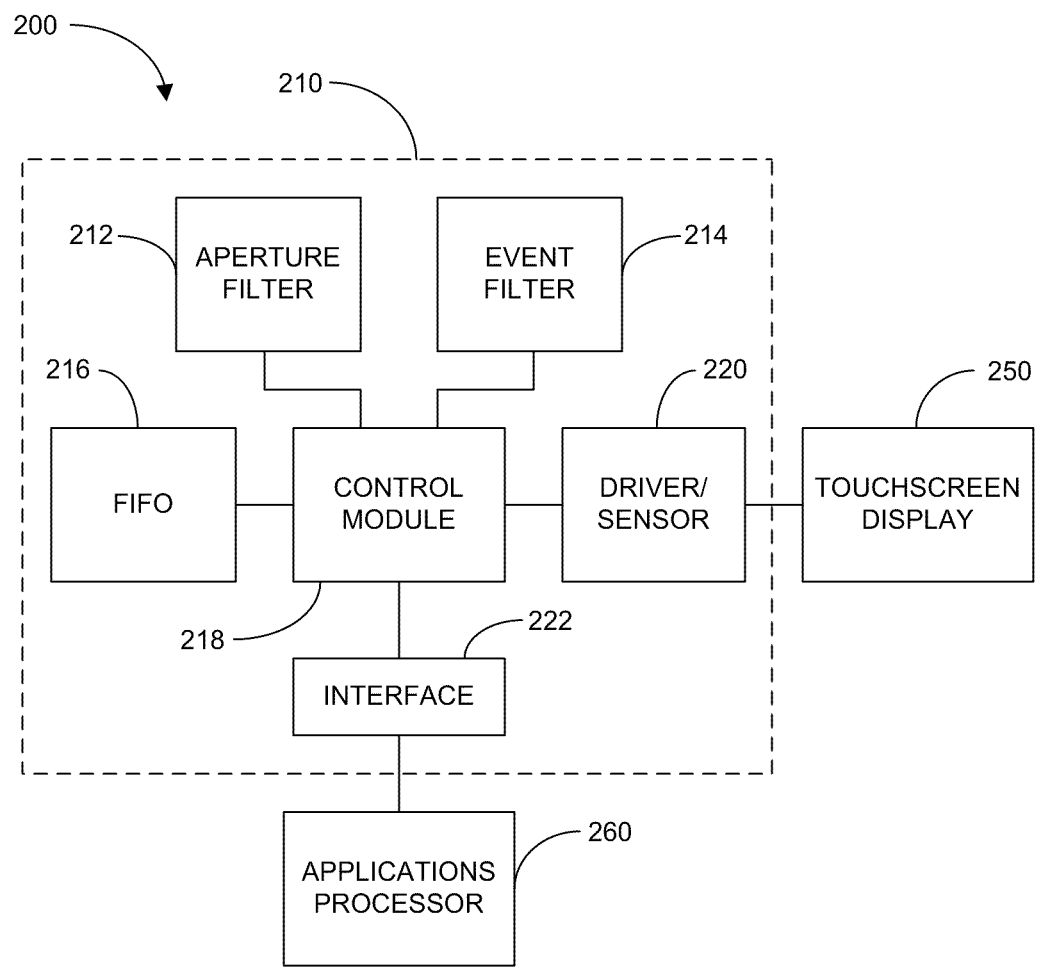
FIG. 2 illustrates a block diagram of an exemplary system for interfacing an applications processor with a touchscreen display in accordance with an embodiment of the invention.

FIG. 2 illustrates a block diagram of an exemplary system 200 for interfacing an applications processor with a touchscreen display in accordance with an embodiment of the invention. In summary, the system 200 includes a touchscreen controller that may be configured to (1) self-schedule the measurement of the touchscreen display, (2) perform the defined touchscreen measurement, (3) analyze the measurement data to determine whether it corresponds to a notable event worthy of informing the applications processor, (4) store the measurement data of the notable event along with an event tag in a memory, and (5) send a notification to the applications processor when event data in the memory is available. As an example, the touchscreen controller may identify notable events as initial touches of the touchscreen display, releases from the touchscreen display, and mid-press drags that exceeds a programmable aperture or distance. The touchscreen controller may also inform the applications processor when there is no more data available in the memory.

In particular, the system 200 comprises a touchscreen controller 210, a touchscreen display 250, and an applications processor 260. The touchscreen controller 210, in turn, comprises an aperture filter 212, an event filter 214, a first-in-first-out (FIFO) memory 216, a control module 218, a driver/sensor 220, and an applications processor interface 222. Although the aperture filter 212 and event filter 214 are shown as separate items, it shall be understood that their functionality may be incorporated into the control module 218.

As discussed in more detail below, the control module 218 receives configuration instructions from the applications processor 260 by way of the interface 222 as to how and when to perform the touchscreen measurements and what events should be captured. For example, the configuration instructions may inform the touchscreen controller 210 of the rate to scan or take measurements of the touchscreen display 250 (e.g., every one microsecond (µs) or every 100 milliseconds (ms)), what one or more measurements to take (e.g., the x-position of the touch, the y-position of the touch, the z-position or pressure of the touch, etc.), and what events to record for subsequent access by the applications processor (e.g., initial touches, mid-press drag that exceeds a defined aperture, touch releases, etc.). In response to these instructions, the control module 218 sets the touchscreen scanning rate of the driver/sensor 220, the aperture dimensions of the aperture filter 212, and the notable events of the event filter 214.

The control module 218 using the driver/sensor 220 monitors the touchscreen display 250 in a lower power mode for an initial touch of the display by the user. If the control module 218 detects that the user has initially touched the touchscreen display 250 and the initial touch is a notable event in accordance with the event filter 214, the control module records the corresponding data (e.g., x-, y-, z-position or pressure of the touch) and an event tag (e.g., 00 indicating an initial touch event) in the FIFO memory 216, and sends an interrupt to the applications processor 260 via the interface 222. The applications processor 260 can then retrieve the event parameters from the FIFO memory 216 at its leisure, and perform one or more program functions based on the event parameters. It shall be understood that the applications processor 260 may retrieve data related to one or more events during a single read of the FIFO memory 216.

After the initial touch, the control module 218 using the driver/sensor 220 periodically scans the touchscreen display 250 in a higher power mode at the selected scanning rate for user interactions. When not scanning, the control module 218 may be configured in a lower power mode. If the control module 218 senses that the user has dragged a pointer or finger across the touchscreen display 250, the control module determines the distances of the drag in the x-direction $\Delta X$ and in the y-direction $\Delta Y$. The control module 218 then sends the $\Delta X$ and $\Delta Y$ information to the aperture filter 212. The aperture filter 212 then determines whether the $\Delta X$ and $\Delta Y$ exceeds the specified aperture dimensions (e.g., whether $\Delta X > \Delta Xa$ or $\Delta Y > \Delta Ya$, where $\Delta Xa$ is the absolute distance between the anchor point and the boundary of the aperture in the x-direction, and $\Delta Ya$ is the absolute distance between the anchor point and the boundary of the aperture in the y-direction). It shall be understood that the aperture may be defined in many other different manners.

If the aperture filter 212 determines that the drag of the user's pointer or finger does not exceed the specified aperture dimension, the aperture filter 212 informs the control module 218 that this is not a notable event worthy of informing the applications processor 260. If, on the other hand, the aperture filter 212 determines that the drag of the user's pointer or finger exceeds the specified aperture dimension, the aperture filter 212 informs the control module 218 that this is a notable event worthy of informing the applications processor 260. In response, the control module 218 writes the measurement data (e.g., x-, y-, z-position or pressure of the touch) and event tag (e.g. 01 indicating a midpress event) in the FIFO memory 216, and sends an interrupt to the applications processor 260 via the interface 222. The applications processor 260 can then retrieve the event parameters from the FIFO memory 216 at its leisure, and perform one or more program functions based on the event parameters.

The control module 218 using the driver/sensor 220 may sense subsequent drags of the user's pointer or finger on the touchscreen display 250, and the control module 218 repeats the same process discussed above to determine whether any one or more of the user's subsequent drags are events worthy of informing the applications processor 260. The control module 218 may then detect that the user has released its pointer or finger from the touchscreen display 250, and inform the event filter 214 of such. If, in accordance with the event filter 214, the touch release is a notable event, the control module 218 records the measurement data (e.g., x-, y-, z-position or pressure of the touch) and event tag (e.g. 10 indicating a touch release event) in the FIFO memory 216, and sends an interrupt to the applications processor 260 via the interface 222. The applications processor 260 can then retrieve the event parameters from the FIFO memory 216 at its leisure, and perform one or more program functions based on the event parameters.

In contrast to prior touchscreen controllers, the touchscreen controller 210 substantially reduces the involvement of the applications processor 260 in the operation of the touchscreen display. In essence, the applications processor 260 has to initially configure the touchscreen controller 210 as to the measurement criteria (e.g., scan rate, position data, etc.) and the data collection criteria (e.g., notable events), be informed of when data is available, and access the available data from the touchscreen controller at its leisure. Additionally, the touchscreen controller substantially reduces data transfer to the applications processor 260 by only sending notable events, instead of sending the applications processor 260 all detectable events regarding user interactions with the touchscreen display 250. This improves the speed and efficiency of the applications processor 260, allowing it to perform more useful functions instead of communicating with the touchscreen controller more frequently. These concepts are explained below with reference to the following referenced figures. Although the touchscreen display 250 has been used to exemplify the various concepts of the invention, it shall be understood that the display could be any position-indicating device.

FIG. 3 illustrates a diagram of an exemplary touchscreen display illustrating an aperture filtering concept in accordance with another embodiment of the invention. In this example, a rectangular coordinate system (24×16 units) is superimposed upon the touchscreen display to illustrate positions in the following exemplary user interaction of the touchscreen display. Also, in this example, an aperture filter having a dimension of plus/minus four (±4) units in the x-direction, and plus/minus four (±4) units in the y-direction has been defined.

According to this example, the user makes an initial touch of the touchscreen display at position "1" having a coordinate of (7, 11), which is captured during a first measurement of the touchscreen display 250 by the touchscreen controller 210. The event filter 214 of the touchscreen controller 210 causes this event to be recorded in the FIFO 216 for subsequent retrieval by the applications processor 260. The touching of the display 250 at position "1" causes the aperture filter 212 to set up a ±4 by ±4 aperture window APER 1 (boundaries are noted as dashed lines) around the anchor position "1" (e.g., position "1" being substantially in the middle of the aperture filter). It shall be understood that the anchor position or point need not be in the middle of the aperture window. Thus, when the touchscreen controller 210 takes the second measurement of the touchscreen display 250, the user has dragged the pointer or his/her finger to the coordinate (9, 10) (noted as a solid black circle). The aperture filter 212 does not cause that event to be recorded in the FIFO 216 because it did not reach or exceed the boundary of the aperture window APER 1.

However, in this example, the user dragged the pointer or his/her finger to position "2" at coordinate (11, 9) when the third measurement of the touchscreen display 250 took place. Position "2" lies at the boundary of the aperture window APER 1. Because the drag now has reached the boundary of the aperture window APER 1, the aperture filter 212 causes the drag event to be recorded in the FIFO 216. Additionally, the aperture filter 212 sets up a new aperture window APER 2 around anchor position "2". Further, in this example, the user has dragged the pointer or his/her finger to position "3" at coordinate (12, 4) when the seventh measurement of the touchscreen display 250 took place. The aperture filter 212 causes the drag to position "3" to be recorded in the FIFO 116 because it exceeded the boundary of the aperture window APER2. However, as noted, the aperture filter 212 does not cause the intermediate positions at coordinates (12, 8), (13, 7), and (13, 6) (noted as solid black circles), captured during the fourth, fifth, and sixth measurements of the touchscreen display 250, to be recorded in the FIFO 216 because these points are within the boundary of aperture window APER 2.

Similarly, the aperture filter 212 sets up a new aperture window APER3 surrounding anchor position "3". Thus, when the user dragged the pointer or his/her finger to position "4" at coordinate (17, 7) when the ninth measurement of the touchscreen display 250 took place, the aperture filter 212 causes the drag to position "4" to be recorded in the FIFO 216, but does not record the intermediate position at coordinate (15, 6) captured during the eight measurement of the touchscreen display 250, since it lies within the aperture window APER3. Further, in this example, the user drags the pointer or his/her finger to position "5" at coordinate (19, 8), and then removes the pointer or his/her finger from the touchscreen display 250. The event filter 214 then causes the removal or release of the pointer or finger to be recorded in the FIFO 216, with the event overriding the aperture criteria.

Then, in the example, the user re-touches the touchscreen display 250 at position "6" with coordinate (22, 14). The event filter 214 causes this event to be recorded in the FIFO 216. This causes the aperture filter 212 to set up a new aperture window APER 6 surrounding anchor position "6". Then, the user has dragged the pointer or his/her finger to position "7" at coordinate (23, 15), and releases or removes the pointer or his/her finger from the touchscreen display 250 detected in the next measurement of the display. Accordingly, the event filter 214 causes the release or removal to be recorded in the FIFO 216, even though the positional change does not meet aperture criteria defined by aperture window APER 6.

The timing waveform entitled "Interrupt Timing Waveform 1 (assuming frequent servicing events, w/aperture)" illustrates that the above exemplary user interaction with the touchscreen display resulted in only seven (7) interrupts of and data transfer to the applications processor 260. On the other hand, without the aperture filter, as illustrated in the timing waveform entitled "Interrupt Timing Waveform 2 (assuming frequent servicing events, w/o aperture)," many more interrupts and data transfers would have been communicated to the applications processor 260, which would slow down and reduce the efficiency of the processor. The timing waveform entitled "Interrupt Timing Waveform 3 (assuming infrequent servicing events)" illustrates that the applications processor 260 may access the data associated with an event at its leisure. For example, in this case, the interrupt for event "1" was issued just after event 1 took place, but the applications processor 260 did not retrieve the associated data after the occurrence of event 7.

FIG. 4 illustrates an exemplary table of data tags of events stored in a first-in-first-out (FIFO) memory 260 in the case where aperture filtering is enabled in accordance with another embodiment of the invention. As discussed with reference to the previous example, the control module 218 using the aperture filter 212 and the event filter 214 records seven (7) events in the FIFO 216 as noted in the table. For each event, the control module 218 records the corresponding x- and y-positions (and z-position or pressure, if applicable), and a tag that indicates the type of event. For example, tag 00 indicates an initial touch event of the touchscreen display, tag 01 indicates a notable mid-press event or dragging of the pointer or finger across the touchscreen display, and 10 indicates a release or removal of the pointer or finger from the touchscreen display. A tag of 11, not shown in this figure, indicates that there is no unread data available for the applications processor 260.

FIG. 5 illustrates an exemplary table of data tags stored in a first-in-first-out (FIFO) memory in the case where aperture filtering is not enabled. Because in this example, aperture filter has been disabled, more mid-press or dragging events are recorded, as noted in the table. This produces much more data transfer to the applications processor 260; thereby reducing the speed and efficiency of the applications processor.

Figure 6:
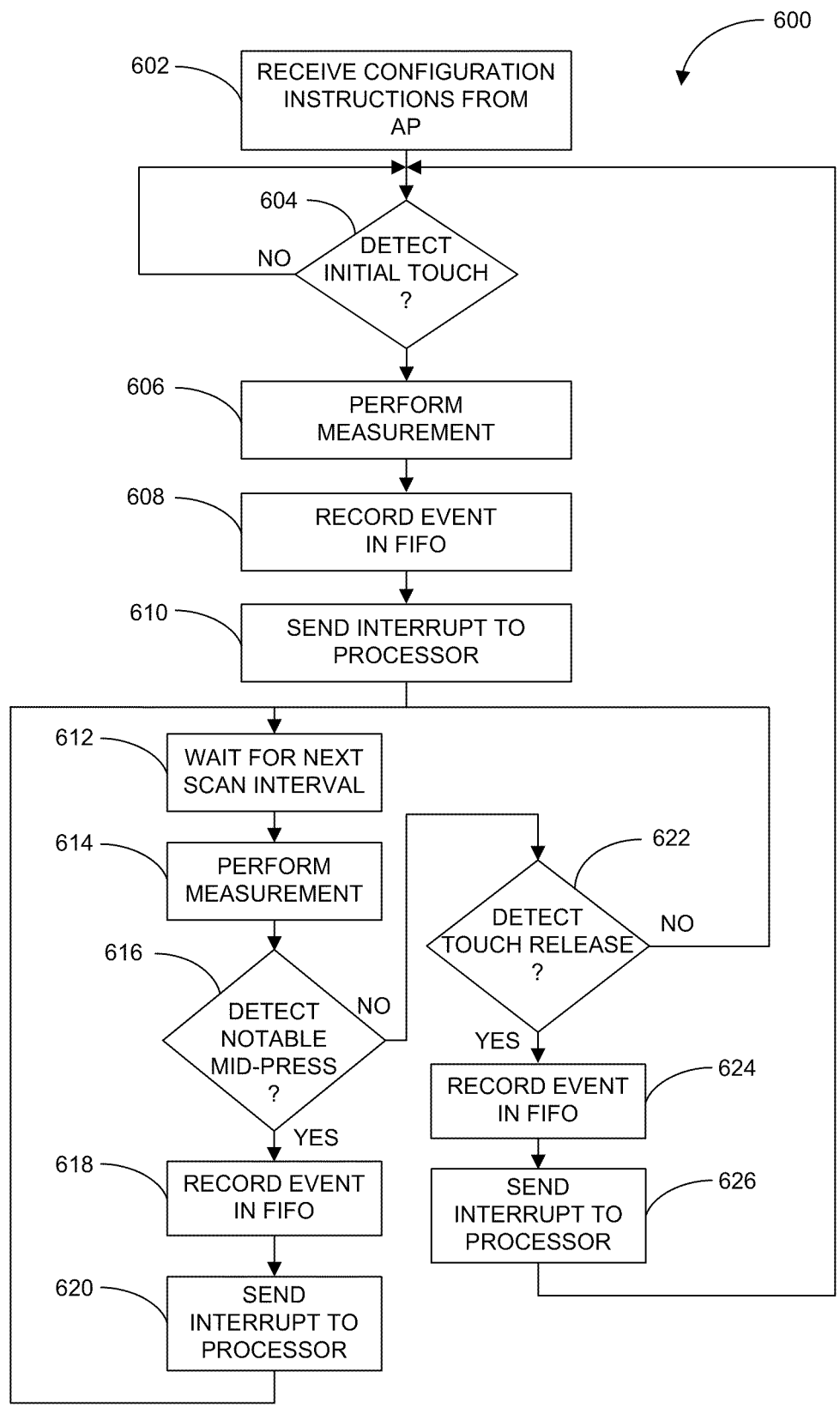
FIG. 6 illustrates a flow diagram of an exemplary method of interfacing the applications processor with the touchscreen display in accordance with another embodiment of the invention.

FIG. 6 illustrates a flow diagram of an exemplary method 600 of interfacing the applications processor 260 with the touchscreen display 250 in accordance with another embodiment of the invention. The method 600 may be implemented by the touchscreen controller 210. According to the method 600, the control module 218 receives configuration instructions from the applications processor 260 via the interface 222 (block 602). The configuration instructions tells the control module 218 the measurement criteria and the data logging criteria. For example, the measurement criteria may specify the frequency or rate in which to perform measurements of the touchscreen display 260, and what measurements to take (e.g., x-position, y-position, z-position or pressure of the touch). The data logging criteria may specify the events to record in a memory (e.g., initial touch, mid-press drags that exceed a defined distance, touch release, etc.) With regard to mid-press drags, the control module 218 may receive dimensions for the aperture window from the applications processor 260 via the interface 222.

Then, according to the method 600, the control module 218 then monitors, in a relatively low power mode, the touchscreen display 250 for an initial touch (block 604). If the control module 218 does not detect an initial touch of the touchscreen display 250, the control module continues to monitor for the initial touch in the relatively low power mode. If, on the other hand, the control module 218 detects an initial touch of the touchscreen display 250, the control module performs a measurement of the touchscreen display 250 (block 606), records the measurement data and an initial touch event identifier or tag in the FIFO 216 (block 608), and sends an interrupt to the applications processor 260 via the interface 222 (block 610). The control module 218 then waits until the next scan interval (block 612).

Then, in the next scan interval, the control module 218 performs another measurement of the touchscreen display 250 (block 614). Based on the measurement data, the control module 218 determines whether the user has performed a notable mid-press event (e.g., dragging the pointer or finger across the touchscreen display 250) (block 616). If the control module 218 does not detect a notable mid-press event, the control module proceeds to the operation specified in block 622. Otherwise, the control module 218 records the measurement data and mid-press event identifier or tag in the FIFO 216 (block 618), and sends an interrupt to the applications processor 260 via the interface 222 (block 620). The control module 218 then waits for the next scan interval per block 612.

If, on the other hand, the control module 218 determines in block 616, that the measurement data does not pertain to a mid-press event, the control module 218 determines whether it pertains to a user removing or releasing the pointer or his/her finger from the touchscreen display 250 (block 622). If the control module 218 determines that it was not a touch release event, the control module proceeds to wait for the next scan interval per block 612. Otherwise, the control module 218 records the measurement data and touch release event identifier or tag in the FIFO 216 (block 624), and sends an interrupt to the applications processor 260 via the interface 222 (block 626). Then, the control module 218 proceeds to detecting the next initial touch by the user per block 604.

Figure 7A:
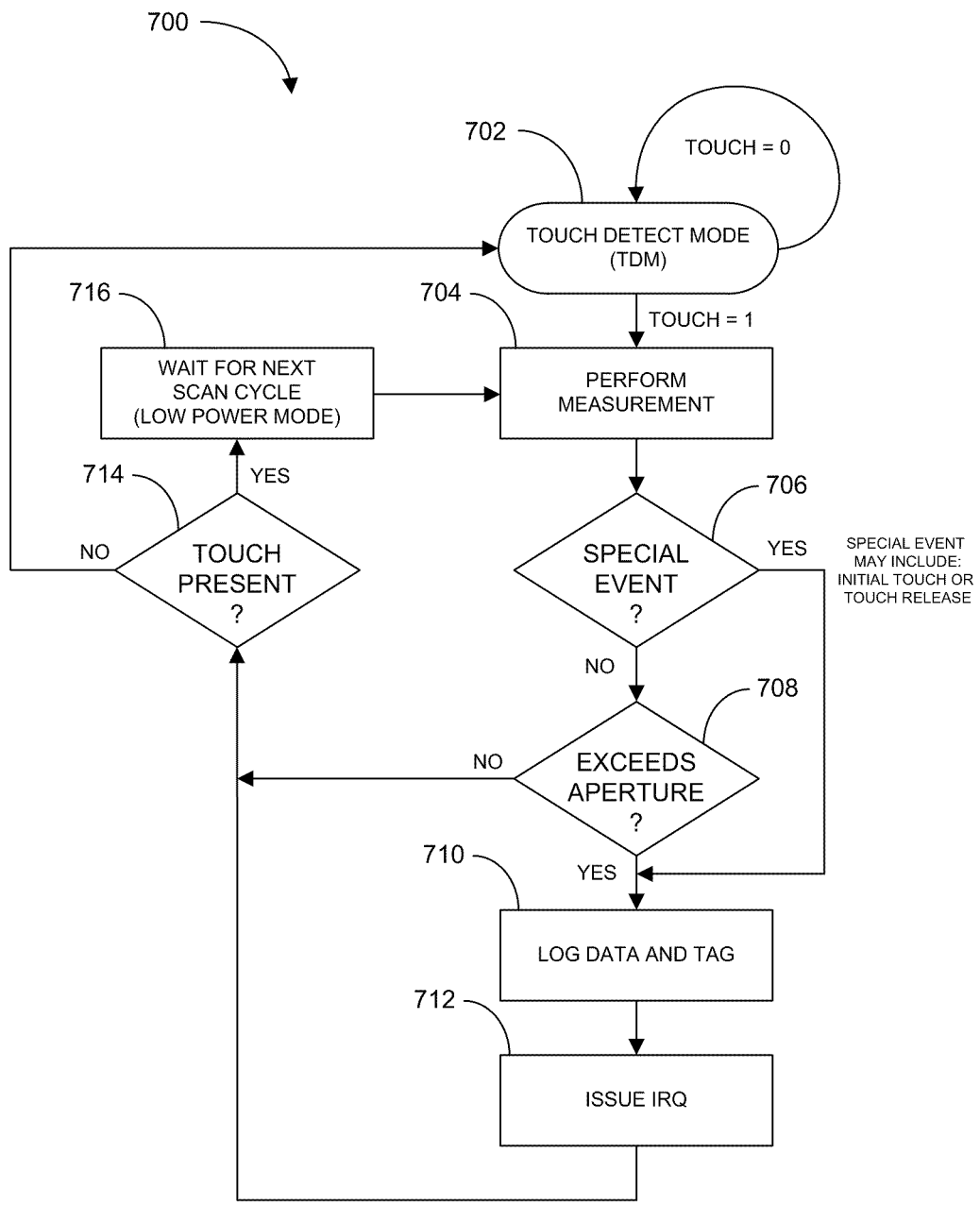
FIG. 7A illustrates a flow diagram of another exemplary method of interfacing the applications processor with touchscreen display in accordance with another embodiment of the invention.

FIG. 7A illustrates a flow diagram of another exemplary method 700 of interfacing the applications processor 260 with touchscreen display 250 in accordance with another embodiment of the invention. According to the method 700, before a user touches the touchscreen display 250 (TOUCH=0), the control module 218 idles in a touch detect mode (TDM), where it is configured to operate in a relatively low power consumption mode to sense the touching of the touchscreen display 250 by the user (block 702). If the control module 218 senses the touching of the touchscreen display 250 (TOUCH=1), it configures itself in a relatively high power consumption mode to perform a measurement of the touchscreen display 250 (block 704).

Based on the measurement data, the control module 218 determines whether it relates to a special event (block 706). For example, the special event may include initial touches and touch releases of the touchscreen display 250. As previously discussed, the applications processor 260 may specify what events are special in the configuration instructions. In this example, the control module 218 identified the initial touch of the touchscreen display 250 as a special event, and thus, logged the measurement data and event identifier in the FIFO 216 (block 710). Additionally, the control module 218 may send an interrupt to the applications processor 260 via the interface 222 to inform it that data is available in the FIFO 216 (block 712). Based on the measurement performed per block 704, the control module 218 determines whether the touchscreen display is being touched (block 714). In this case, the control module 218 determines that the user is still touching the touchscreen display 250, and thus, the control module reconfigures itself in the relatively low power mode until the next scheduled measurement cycle (block 716).

In the next measurement cycle, the control module 218 performs another measurement of the touchscreen display 250 (block 704). In this example, the user merely dragged his/her finger or stylus to a different region of the touchscreen display 250. In such a case, the control module 218 may not recognize that event as being a special event pursuant to block 706. Accordingly, the control module 218 determines whether the mid-press drag exceeds a defined aperture window (block 708). If yes, the control module 218 logs the measurement data and event identifier in the FIFO 216 (block 710), sends an interrupt to the applications processor 260 via the interface 222 to inform it that data is available in the FIFO 216 (block 712), and then proceeds to block 714. On the other hand, if the control module 218, in block 708, determines that the mid-press drag did not exceed the aperture window, the control module then proceed directly to block 714. In this case, the control module 218, in block 714, determines that the touchscreen display is being touched based on the measurement taken per block 704, and then proceeds to wait for the next scan cycle per block 716.

In the next measurement cycle, the control module 218 performs another measurement of the touchscreen display 250 (block 704). In this example, the user has removed his/her finger or stylus from the touchscreen display 250. Accordingly, the control module 218 determines that the touch release is a special event (block 706). The control module 218 then logs the measurement data and event identifier in the FIFO 216 (block 710), sends an interrupt to the applications processor 260 via the interface 222 to inform it that data is available in the FIFO 216 (block 712), and then proceeds to block 714. In block 714, the control module 218 determines that the touchscreen display is not being touched based on the measurement taken per block 704, and then it reconfigures itself in the touch detect mode (TDM) per block 702.

Figure 7B:
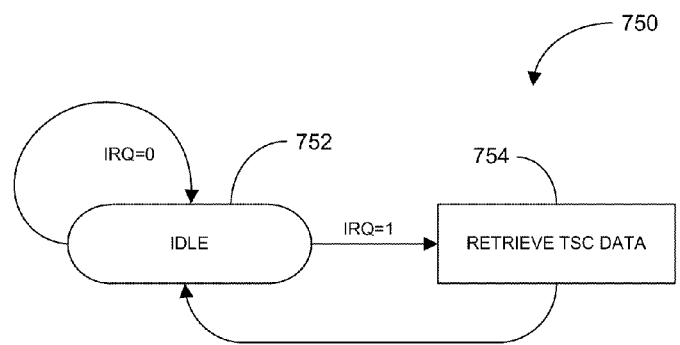
FIG. 7B illustrates a flow diagram of an exemplary method of an applications processor interfacing with a touchscreen controller in accordance with another embodiment of the invention.

FIG. 7B illustrates a flow diagram of an exemplary method 750 of the applications processor 250 interfacing with a touchscreen controller 210 in accordance with another embodiment of the invention. As discussed above, because of the data measurement and event recordation of the touchscreen display 250 is now performed by the touchscreen controller 210, the role of the applications processor 260 is merely to receive notifications as to when data is available for reading, and read the data at its leisure. Thus, according to the method 750, the applications processor 260 remains in an idle mode with regards to the touchscreen display 250 when the interrupt signal indicates that there is no available data (IRQ=0) (block 752). When the interrupt signal indicates that data is available (IRQ=1), the applications processor 260 retrieves the data at its leisure (block 754). If the applications processor 260 accesses all of the available data and thus the interrupt signal indicates no more data available (IRQ=0), it returns back to idle mode (block 752). Alternatively, instead of using the interrupt signal, the applications processor 260 may poll the FIFO memory 216 to determine whether or not event data is available. As previously discussed, a code (e.g., ETAG=11) may be stored in the FIFO memory 216 to indicate that there is no more event data.

Figure 7C:
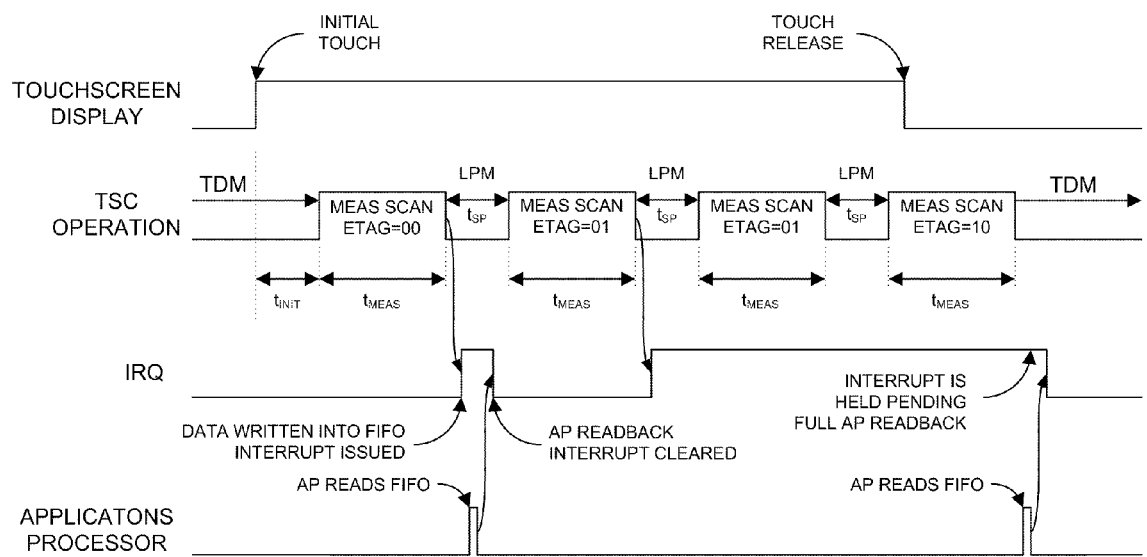
FIG. 7C illustrates a timing diagram related to an exemplary operation of the touchscreen controller in accordance with another embodiment of the invention.

FIG. 7C illustrates a timing diagram related to an exemplary operation of the touchscreen controller 210 in accordance with another embodiment of the invention. The top waveform illustrates the user's interaction with the touchscreen display 250, and namely, in this example, the initial touch and touch release of the display as noted. The second waveform from the top illustrates the operations of the control module 218 in performing the display measurement and data collection processes. The third waveform from the top illustrates the state of the interrupt signal IRQ indicating when data is available, and when all the data has been read by the applications processor 260. The bottom waveform illustrates the operation of the applications processor 260 in reading the data from the FIFO memory 216.

As indicated at the far left part of the diagram, prior to the user touching the touchscreen display 250 as indicated by the low logic level of the touchscreen display activity signal, the interrupt signal IRQ is at a low logic level indicating that there is no available data in the FIFO 216, and the control module 218 is in the touch detect mode TDM. In response to the touchscreen display 250 being touched as indicated by the touchscreen display activity signal transitioning to a high logic level, the control module 218 begins performing a measurement scan of the touchscreen display 250 after an initial time interval $t_{INIT}$. The control module 218 scans the touchscreen display 250 for a measurement time interval $t_{MEAS}$, acquires the measurement data, identifies the event as an initial touch, and stores the measurement data and event identifier (ETAG=00) in the FIFO 216.

After the measurement scan, the control module 218 enters a relatively low power mode (LPM) for a sample time interval $t_{SP}$ until the next measurement scan. In response to the measurement, the control module 218 causes the interrupt signal IRQ to transition to a high logic level indicating that data is available in the FIFO 216 for access by the applications processor 260. In this example, the applications processor 260 responds relatively quickly to the first indication of available data, and reads the data from the FIFO 216 as indicated in the bottom waveform. In response to the reading of the data, and the FIFO 216 now having no available data, the control module 218 causes the interrupt signal IRQ to transition to the low logic level indicating again that there is no available data in the FIFO 216.

After the first sample time interval $t_{SP}$, the control module 218 performs another measurement scan of the touchscreen display 250 for a second measurement time interval $t_{MEAS}$, acquires the measurement data, identifies the event as a mid-press drag, and stores the measurement data and event identifier (ETAG=01) in the FIFO 216. After the measurement scan, the control module 218 enters the low power mode (LPM) for another sample time interval $t_{SP}$ until the next measurement scan. In response to the measurement, the control module 218 causes the interrupt signal IRQ to transition to the high logic level indicating again that data is available in the FIFO 216 for access by the applications processor 260. In this example, however, the applications processor 260 does not respond quickly to the indication of available data as noted by the interrupt signal remaining in the high logic level.

After the second sample time interval $t_{SP}$, the control module 218 performs another measurement scan of the touchscreen display 250 for a third measurement time interval $t_{MEAS}$, acquires the measurement data, identifies the event as another mid-press drag, and stores the measurement data and event identifier (ETAG=01) in the FIFO 216. After the measurement scan, the control module 218 enters the low power mode (LPM) for another sample time interval $T_{SP}$ until the next measurement scan. Since there is still data available in the FIFO 216, the control module 218 maintains the interrupt signal IRQ at the high logic level to still indicate that data is available in the FIFO 216 for access by the applications processor 260. Again, in this example, the applications processor 260 does not respond quickly to the indication of available data as noted by the interrupt signal IRQ continuing to remain at the high logic level.

After the third sample time interval $t_{SP}$, the control module 218 performs another measurement scan of the touchscreen display 250 for a fourth measurement time interval $t_{MEAS}$, acquires the measurement data, identifies the event as a touch release, and stores the measurement data and event identifier (ETAG=10) in the FIFO 216. After the measurement scan, the control module 218 enters the touch detect mode (TDM) for monitoring the next touch of the touchscreen display 250. Since there is still data available in the FIFO 216, the control module 218 maintains the interrupt signal IRQ at the high logic level to still indicate that data is available in the FIFO 216 for access by the applications processor 260. In this example, the applications processor 260 soon thereafter reads all of the available data in the FIFO 216 as noted by the interrupt signal IRQ transitioning to the low logic level to indicate that there is no available data in the FIFO. This example illustrates that the applications processor 260 is at will to read data related to one or more events from the FIFO 216 at any time as long as the FIFO does not overflow with data, which may result in loss of data.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of interfacing a touchscreen with an applications processor, comprising:
    generating a first signal representing a user touching the touchscreen;

generating a second signal representing the user releasing the touchscreen;
generating a third signal representing the user dragging a touch across the touchscreen, the step of generating a third signal including:
  defining an aperture window having a boundary around the touch on the touchscreen;
  monitoring a movement of the touch on the touchscreen; and
  when the user drags the touch to a point on the boundary, recording the user dragging event in a memory and defining a new aperture window around the point on the boundary;
transmitting the first, second, and third signals to a controller;
analyzing whether each of the first, second, and third signals satisfies at least one predetermined criterion;
based on the analysis, storing in the memory data related to the at least one of the first, second, and third signals;
responsive to storage of the data in the memory, transitioning an interrupt signal to a first logic level to indicate that the data in the memory is available for access by an applications processor; and
responsive to reading all of the data in the memory by the applications processor, transitioning the interrupt signal to a second logic level to indicate that there is no data in the memory available for access by the applications processor.

2. The method of claim 1, wherein dragging the touch across the touchscreen reaches or exceeds a boundary of a selected aperture.

3. The method of claim 1, wherein the memory comprises a first-in-first-out (FIFO) memory that is configured to store one or more event tags.

4. The method of claim 1, further comprising sending the interrupt signal to the applications processor when data is available for the applications processor.

5. The method of claim 1, further comprising sending status information as to whether data is available in response to being polled by the applications processor.

6. The method of claim 1, wherein the data comprises:
  a position coordinate related to the at least one of the first, second, and third signals; and
  one or more tags to identify the type of the at least one of the first, second, and third signals.

7. A controller for interfacing an applications processor comprising a position-indicating device, the controller comprising:
  an interface;
  a memory; and
  a control module adapted to:
    measure the position-indicating device to generate data;
    analyze the data to determine whether the data relates to a signal that represents one of a user touching the position-indicating device, the user releasing the position-indicating device, and the user dragging a touch across the position-indicating device;
    store the analyzed data in the memory;
    responsive to storage of the data in the memory, transition an interrupt signal to a first logic level to indicate that the data in the memory is available for access by the applications processor; and
    responsive to reading all of the data in the memory by the applications processor, transition the interrupt signal to a second logic level to indicate that there is no data in the memory available for access by the applications processor; and
    an aperture filter that defines an aperture window having a boundary around the touch and, when the user drags the touch to a point on the boundary, defines a new aperture window around the point and causes a drag event to be stored in the memory.

8. The controller of claim 7, further comprising a driver/sensor through which the control module measures the position-indicating device.

9. The controller of claim 7, further comprising an event filter adapted to define user interface events.

10. The controller of claim 7, wherein the control module is further adapted to:
  receive configuration information from the applications processor via the interface; and
  automatically measure the position-indicating device to generate data based on the configuration information.

11. The controller of claim 10, wherein the control module is further adapted to:
  analyze the data to determine whether it relates to a notable event; and
  store the analyzed data in the memory only if the data relates to the notable event.

12. The controller of claim 11, wherein the configuration information specifies a rate to measure the position-indicating device, and wherein the control module is adapted to automatically measure the position-indicating device based on the rate.

13. The controller of claim 11, wherein the configuration information defines a measurement criterion of the position-indicating device, and wherein the control module is adapted to measure the position-indicating device based on the measurement criterion.

14. The controller of claim 11, wherein the control module is adapted to operate in a lower power mode when not measuring the position-indicating device, and operate in a higher power mode when measuring the position-indicating device.

15. A method of interfacing a position-indicating device with an applications processor, the method comprising:
  receiving configuration information from the applications processor;
  automatically measuring the position-indicating device based on the configuration information to generate data;
  storing the generated data in a memory;
  analyzing the data to determine whether the data relates to a signal that represents a notable event comprising one of a user touching the position-indicating device, the user releasing the position-indicating device, and the user dragging a touch across the position-indicating device;
  responsive to storage of the data in the memory, transitioning an interrupt signal to a first logic level to indicate that the data in the memory is available for access by the applications processor; and
  responsive to reading all of the data in the memory by the applications processor, transitioning the interrupt signal to a second logic level to indicate that there is no data in the memory available for access by the applications processor,
  wherein the step of analyzing the data to determine whether the data relates to a notable event includes:
    defining an aperture window having a boundary around the touch on the touchscreen;
    monitoring a movement of the touch on the touchscreen; and when the user drags the touch to a point on the boundary, determining the user dragging as a notable event and defining a new aperture window around the point on the boundary.

16. The method of claim 15, wherein storing the data comprises storing the data in the memory only if the data relates to the notable event.

17. The method of claim 16, wherein the configuration information specifies a rate of measuring the position-indicating device, and wherein a frequency of measuring the position-indicating device is based on the specified rate.

18. The method of claim 16, wherein the configuration information specifies a measurement criterion of the position-indicating device.

19. The method of claim 18, wherein the measurement criterion comprises a coordinate in one or more dimensions of a current position of the position-indicating device, or other characteristics related to the current position of the position-indicating device.

20. The method of claim 16, wherein the configuration information defines the notable event.

21. The method of claim 20, wherein the notable event includes an initial touch of the position-indicating device, a touch release of the position-indicating device, or a movement of the position-indicating device that exceeds a defined distance.

22. The method of claim 16, wherein automatically measuring the position-indicating device is initiated upon detecting an initial interaction of the position-indicating device by the user.

23. The method of claim 16, further comprising:
operating in a relatively low power mode while not measuring the position-indicating device; and
operating in a relatively high power mode while measuring the position-indicating device.

24. The method of claim 16, further comprising:
generating an identifier related to the notable event; and
storing the identifier with corresponding data in the memory.

25. The method of claim 16, further comprising sending status information as to whether data related to one or more events is available in response to being polled by the applications processor.

26. The method of claim 16, wherein the position-indicating device comprises a touchscreen display.

27. The method of claim 16, wherein the memory comprises a first-in-first-out (FIFO) memory device that is configured to store one or more event tags that identify types for the notable event.

* * * * *